US011443490B2

(12) United States Patent
Verma et al.

(10) Patent No.: US 11,443,490 B2
(45) Date of Patent: Sep. 13, 2022

(54) SNAPPING, VIRTUAL INKING, AND ACCESSIBILITY IN AUGMENTED REALITY

(71) Applicant: VMware, Inc., Palo Alto, CA (US)

(72) Inventors: Shubham Verma, Bangalore (IN); Prabhakara Rao Narnakaje Venugopala, Bangalore (IN); Kannan Balasubramanian, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 19 days.

(21) Appl. No.: 17/181,406

(22) Filed: Feb. 22, 2021

(65) Prior Publication Data

US 2021/0201592 A1 Jul. 1, 2021
US 2022/0198757 A9 Jun. 23, 2022

Related U.S. Application Data

(63) Continuation of application No. 16/352,845, filed on Mar. 14, 2019, now Pat. No. 10,957,107.

(30) Foreign Application Priority Data

Jan. 9, 2019 (IN) .............................. 201941001029

(51) Int. Cl.
*G06T 19/00* (2011.01)
*G06T 11/40* (2006.01)
(Continued)

(52) U.S. Cl.
CPC .......... *G06T 19/006* (2013.01); *G06F 3/0486* (2013.01); *G06T 11/40* (2013.01); *G06F 3/0488* (2013.01)

(58) Field of Classification Search
CPC ................... G06T 19/006; G06T 11/40; G06T 2219/2004; G06T 19/20; G06T 11/00;
(Continued)

(56) References Cited

U.S. PATENT DOCUMENTS 8,141,090 B1 3/2012 Graupner et al.
8,386,963 B2 2/2013 Russ et al.
(Continued)

OTHER PUBLICATIONS

Adalberto L. Simone; A Cross-Device Drag-and-Drop Technique; MUM '13: 12th International Conference on Mobile and Ubiquitous Multimedia; Dec. 2013 (Year: 2013).

*Primary Examiner* — Michael Le
(74) *Attorney, Agent, or Firm* — Patterson & Sheridan, LLP

(57) ABSTRACT

Embodiments of the present disclosure relate to providing an augmented reality experience. Embodiments include receiving, from an augmented reality or virtual reality (AR/VR) device, first input that identifies application content and a location of an artifact in an AR/VR environment. Embodiments include identifying a region in the environment based on the location, the region corresponding to the artifact. Embodiments include receiving the application content from an application. Embodiments include composing a first scene, the application content being overlaid onto the region. Embodiments include transporting the first scene to the AR/VR device for display. Embodiments include receiving, from the client device, second input in the region in the environment. Embodiments include composing a second scene wherein the application content is modified based on the second input. Embodiments include transporting the second scene to the AR/VR device for display.

12 Claims, 7 Drawing Sheets

(51) Int. Cl.
*G06F 3/0486* (2013.01)
*G06F 3/0488* (2022.01)

(58) Field of Classification Search
CPC ... G06F 3/0486; G06F 3/0488; G06F 3/04883
See application file for complete search history.

(56) References Cited

U.S. PATENT DOCUMENTS

| | | | |
|---|---|---|---|
| 9,436,335 | B1* | 9/2016 | Scherer ................. G06F 3/023 |
| 2007/0002028 | A1* | 1/2007 | Morrison ............... G06F 3/042 |
| | | | 345/173 |
| 2010/0306649 | A1 | 12/2010 | Russ et al. |
| 2013/0290857 | A1* | 10/2013 | Beveridge ............ G06F 16/957 |
| | | | 715/740 |
| 2014/0040769 | A1* | 2/2014 | Lazaridis ............. G06F 3/0483 |
| | | | 715/752 |
| 2015/0235432 | A1* | 8/2015 | Bronder ................ G06F 3/012 |
| | | | 345/633 |
| 2016/0034159 | A1 | 2/2016 | Vranjes et al. |
| 2018/0095542 | A1* | 4/2018 | Mallinson ............ G06T 19/006 |
| 2018/0335921 | A1 | 11/2018 | Karunamuni et al. |
| 2019/0056858 | A1 | 2/2019 | Baer et al. |

* cited by examiner

SNAPPING, VIRTUAL INKING, AND ACCESSIBILITY IN AUGMENTED REALITY

RELATED APPLICATIONS

The present patent is a continuation of, and hereby claims priority under 35 U.S.C § 120 to pending U.S. patent application Ser. No. 16/352,845, entitled "SNAPPING, VIRTUAL INKING, AND ACCESSIBILITY IN AUGMENTED REALITY," by the same inventors, filed on 14 Mar. 2019. The present patent further claims priority under 35 USC § 119 to India Patent Application No. 201941001029, filed Jan. 9, 2019, to which U.S. patent application Ser. No. 16/352,845 also claims priority.

BACKGROUND

Users typically interact with applications running on computing devices (e.g., desktop and laptop computers, mobile phones, tablets, and the like) using input devices such as keyboards, mice, and touch-screens, and output is usually provided to users through display devices such as monitors. Due to the inherent limitations in these forms of input and output, emerging technologies such as virtual reality (VR) and augmented reality (AR) involve the expansion of input and output methods.

Virtual reality (VR) technologies generally involve the computer-implemented simulation of up to a 360-degree experience which a user views using, for example, a wearable display (e.g., VR goggles). Augmented reality (AR) technologies generally involve the real-time addition of simulated content into a real-life scene being captured by a user device (e.g., a camera), which the user views through a display device, such that the simulated content appears through the display device to be present in the real-life scene. In both VR and AR technologies, users may provide input through traditional input methods (e.g., keyboards, mice, touchscreens, audio, and the like) as well as through movements and gestures (e.g., captured by motion sensors, cameras, and the like).

While the potential uses for VR and AR technologies are many and varied, there is currently only a limited number of computing applications which support these technologies, and these applications. Furthermore, existing VR and AR applications often make limited use of the unique capabilities of VR and AR technologies, such as expanded display areas. As such, there is a need in the art for VR and AR applications that provide improved integration with VR and AR environments.

SUMMARY

Herein described are one or more embodiments of a method for providing an augmented reality experience. The method generally includes: receiving, by a computing device from an augmented reality or virtual reality (AR/VR) device, first input that identifies application content and a location of an artifact in an AR/VR environment; identifying, by the computing device, a region in the environment based on the location, wherein the region corresponds to the artifact; receiving, by the computing device, the application content from an application; composing, by the computing device, a first scene wherein the application content is overlaid onto the region; transporting, by the computing device, the first scene to the AR/VR device, wherein the AR/VR device displays the first scene; receiving, by the computing device from the client device, second input in the region in the environment; composing, by the computing device, a second scene wherein the application content is modified based on the second input; and transporting, by the computing device, the second scene to the AR/VR device, wherein the AR/VR device displays the second scene.

Also described herein are embodiments of a computer system, wherein software for the computer system is programmed to execute the method described above for providing an augmented reality experience.

Also described herein are embodiments of a non-transitory computer readable medium comprising instructions to be executed in a computer system, wherein the instructions when executed in the computer system perform the method described above for providing an augmented reality experience.

DETAILED DESCRIPTION

Figure 1A:
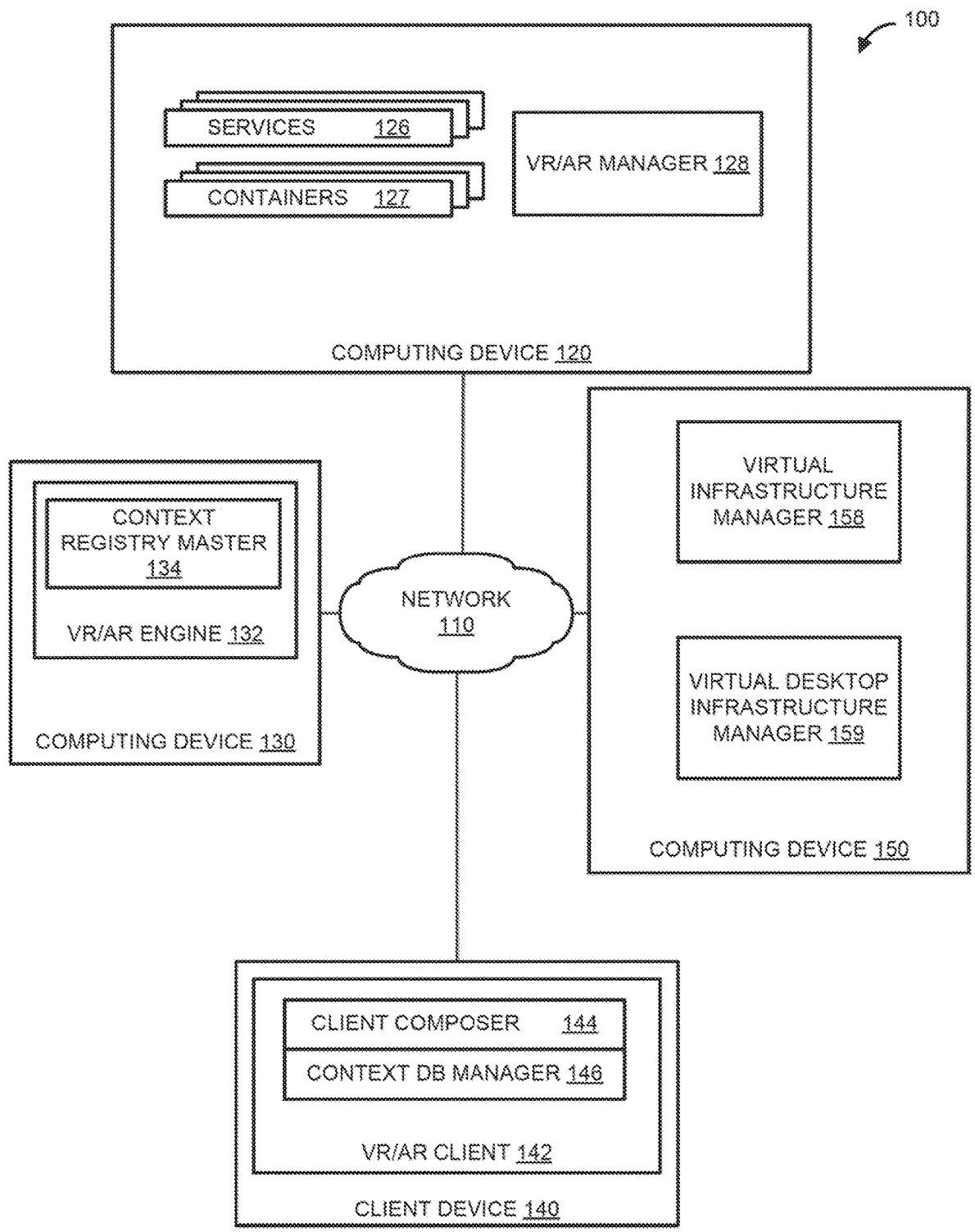
FIG. 1A illustrates components of an example computing environment in which an embodiment may be implemented.

Embodiments presented herein relate to techniques for providing a virtual reality (VR) and/or augmented reality (AR) experience that includes snapping, virtual inking, and/or accessibility features. In certain embodiments, aspects of processing associated with the VR/AR experience may be performed by a VR/AR manager executing on one or more computing devices (e.g., a server) or entities separate from the client device through which the user views the VR/AR content (e.g., VR or AR goggles/glasses, a mobile phone, or the like), and separate from an application with which the user interacts through VR/AR using the client device. This independent, remote processing allows for the VR/AR engine to run more efficiently, not being limited to the resources of the client device, and to be compatible with applications which do not offer native VR/AR support. These techniques further allow for features such as window snapping, virtual inking, and accessibility features to be provided in a VR/AR environment for applications that do not necessarily offer native support for VR/AR or for these features.

"Window snapping" generally refers to a feature in which a user drags a window to a particular region, such as a side/corner, of a display area and the dragged window "snaps" to that region, sometimes occupying a percentage of the region, such as starting from a side of region onto which the window is dropped. Techniques described herein allow window snapping to be utilized in an AR/VR environment, such as by allowing a user to "drag and drop" application content, such as a window, onto a particular point in a VR/AR environment and then "snapping" the application content to a region associated with the point in the VR/AR environment.

"Virtual inking," as used herein, generally refers to a feature wherein a user provides input in a VR/AR environment that results in a visual representation of the input being displayed in the VR/AR environment. For example, techniques described herein allow a user to "snap" a window to a touch pad in a VR/AR environment, such as a touch pad of a laptop computer or a touch screen of a tablet computer, and then provide input to the window through touch input to the touchpad. In certain embodiments, "virtual ink" that represents the touch input is displayed in the VR/AR environment (e.g., the user sees virtual ink appearing in the VR/AR environment as the user provides a signature via a touch pad).

"Accessibility features," as used herein, generally refers to features that make resources accessible to a user who otherwise would find it difficult or have no access to the resources, such as due to disability or language barriers. For example, accessibility features may include magnification of content, audio narration of content, changing one or more colors of content (e.g., for users with color blindness), translation of content from one language to another, and other accessibility features. Techniques described herein allow accessibility features to be provided in VR/AR environments, such as by allowing users to activate and interact with accessibility features in defined regions of an VR/AR environment. For example, a region above an application window displayed in a VR/AR environment may be designated for displaying a magnified view of a portion of the application window.

According to embodiments of the present disclosure, a scene detected by a client device may be augmented with particular content from an application (e.g., individual components within a user interface of the application, such as text boxes, graphics, and the like, or an application window). For example, the application (e.g., a virtualization application or remote desktop application) may request the detection of a particular context (such as the presence of a certain object or artifact) in a scene (e.g., a user's environment) so that, when the context is detected, certain content from the application may be used to augment the scene. For example, embodiments of the present disclosure may allow one or more contexts for detection to be registered (e.g., at the request of one or more applications) so that one or more client devices (e.g., VR/AR-capable devices) which interact with the one or more applications may search for and detect the one or more registered contexts for detection. In certain embodiments, a client device may prompt a user to approve a context for detection (e.g., at the time the context for detection is registered).

According to embodiments, a VR/AR engine may acquire real-time image data from a client device, captured using a sensor such as a camera of the client device. The VR/AR engine may also acquire input from various other sensors (e.g., accelerometer, gyrometer, magnetometer, global position system (GPS), and the like). If the client device comprises a wearable AR display, for example, real-time images of the user's surroundings may be captured by a camera associated with the wearable AR display and provided to the VR/AR engine so that contexts (e.g., including artifacts) may be detected and augmentation may be performed. In alternative embodiments, the client device may perform processing to detect contexts.

In certain embodiments, an application may define one or more regions adjacent to an artifact that is augmented with application content as also being designated for displaying application content. For instance, the VR/AR engine may receive a definition from the application that rectangular regions of certain sizes to both the left and right of the artifact are regions in which application content can be displayed. The application may, for example, be a virtual desktop application, and the regions may simulate a "multiple monitor" setup in which the execution screen of the virtual desktop is divided among multiple display regions. The VR/AR engine may, in some cases, display outlines of the regions in the VR/AR scene provided to the client device. A user of the client device may be able to "drag and drop" application content to the regions, and the application content may snap into the regions. For example, the VR/AR engine may receive input from the client device that includes a drag and drop action of a particular application window from a virtual desktop screen onto a point with a region. The VR/AR engine may determine that the point is within the region, and may snap the application window into the region. For example, the VR/AR engine may retrieve the contents of the application window from the application and augment the region with the application window in the scene. For instance, the VR/AR engine may stretch the application window to match the size of the region in the scene.

VR/AR manager may then provide the scene to the client device for display to the user (e.g., as an augmented reality experience in which the application content is projected onto the user's environment in the region).

The user may also be able to drag and drop application content onto a touch pad, and the VR/AR engine may snap the application content onto the touch pad. The user may then be able to provide input via the touch pad to the application window. The VR/AR engine receives the input and provides it to the application. In some embodiments, the VR/AR engine may project a visual representation of the input, such as virtual ink, in the scene as the user provides the input so that the user can see ink appearing as touch input is provided.

The VR/AR engine may also provide accessibility features in the scene. For example, the user may activate and/or configure an accessibility feature within an application screen, and VR/AR engine may add the accessibility feature into the scene based on the user's input. In one example, the user activates a magnification feature within a virtual desktop screen displayed within a scene, and the VR/AR engine adds a magnification of a portion of the virtual desktop screen to a region adjacent to the virtual desktop screen in the scene and sends the scene to the client device for display to the user.

FIG. 1A illustrates components of a computing environment 100 in which embodiments of the present disclosure may be implemented. As shown, system 100 includes computing device 120, computing device 130, client device 140, and computing device 150, connected by network 110 (e.g., the internet). Computing devices 120, 130, and 150 may comprise physical or virtual computing devices (e.g., servers, virtual machines, or other computing entities) that are connected to network 110. In some embodiments, one or more of computing devices 120, 130, and 150 may be virtual machines running on hosts as described below with respect to FIG. 1B. While three computing devices, 120, 130, and 150 are depicted, there may be any number of computing devices in computing environment 100. Client device 140 may comprise a computing device such as a desktop or laptop computer, mobile phone, tablet computer, or a virtual realty or augmented reality device (e.g., VR goggles, wearable AR display, etc.).

Computing device 120 comprises one or more services 126, which may, for example, comprise one or more web services or native libraries accessed by client device 140 via VR/AR client 142. For example, VR/AR client 142 may comprise an interface (e.g., a browser or other local software interface, such as a VR/AR software application) through which a user of client device 140 accesses a service 126. For example, the user may launch an application through the interface on client device 140, which may prompt client device 140 to request content from one of services 126 on computing device 120, and computing device 120 may respond with the requested content. In one embodiment, the service 126 may comprise a virtualization program through which the user provisions, manages, and accesses virtual machines. While services 126 are depicted as being located on a single computing device 120, services 126 may also comprise one or more distributed services which are distributed across a plurality of computing devices.

Computing device 120 also comprises one or more containers 127, which may comprise, for example, containerized applications, such as big data analytics or number-crunching services (e.g., financial, healthcare, analytics, and the like). Containers 127 may also be accessed by client device 140 in a similar manner to that described above with respect to services 126.

Computing device 120 further comprises VR/AR manager 128, which may perform operations related to providing a virtual reality or augmented reality experience, as described herein. For example, VR/AR manager 128 (the components of which are described in more detail with respect to FIG. 2) may receive a request from one of services 126 or containers 127 to register a context for detection. In one example, a service 126 may send the request when it has content (e.g., a notification) to add to a scene as part of an augmented reality experience when a certain context is detected. The service may initiate this augmentation process on its own (e.g., according to predetermined settings, such as a default setting indicating that an application screen is to be augmented onto a particular context) or in response to user input received from client device 140 (e.g., specifying that an application window is to be added to an artifact, such as a piece of paper or a touch pad, when the artifact is detected in the user's environment by one or more sensors associated with client device 140). The request to register the context for detection may comprise, for example, context information, such as a context identifier, an image of the context, a context scope (e.g., specifying whether the context is private such that only one application will be notified when the context is detected, public such that all applications will be notified when the context is detected, or limited to a pool of specified applications which will be notified when the context is detected), and/or other descriptive data. VR/AR manager 128 may register the context to be detected by sending the context information to context registry master 134 of VR/AR engine 132, which may store the context information in a registry and forward the context information to a client device (e.g., client device 140) to be detected. It is noted that, while VR/AR engine 132 is depicted on computing device 130, it may alternatively be located on computing device 120.

VR/AR manager 128 may receive a notification from client device 140 (or from VR/AR engine 132, which may receive the notification from client device 140 and forward it to VR/AR manager 128) when the context has been detected (e.g., using a camera associated with client device 140), and may receive context detection information comprising, for example, the context identifier and a detected pose of one or more artifacts defined in the context. The detected pose may, for example, comprise coordinates and/or orientations of the one or more artifacts in the scene relative to the origin (e.g., the center or bottom left corner of an image comprising the scene or some other point in the scene that is designated to be the origin). VR/AR manager 128 may notify the service 126 which requested registration of the context that the context has been detected. The notification may, for example, comprise the context detection information. In response, the service 126 may provide VR/AR manager 128 with application content and a relative pose of the application content. The application content may, for example, comprise a graphical object, a text notification, an application window (e.g., for entry of a signature), or the like. The relative pose of the application content may, for example, comprise coordinates of the application content relative to the origin or relative to the one or more artifacts which were detected in the scene. VR/AR manager 128 may compose a scene comprising the application contents from one or more applications based on the relative pose of the respective application contents, and may send the scene to client device 140, which renders the scene for display as an augmented reality experience wherein the application contents are rendered in the relative pose.

In some embodiments, the artifact is a touch pad and VR/AR manager 128 overlays the application content onto the touchpad in the scene. For instance, the application content may be scaled to the dimensions of the touch pad such that there is a "one-to-one" mapping between the touch pad and the application content. In certain embodiments, the touch pad is connected to client device 140 and client device 140 sends input received from the user via touch input to the touch pad to VR/AR manager 128. VR/AR manager 128 then provides the input to the application, such as one of services 126. VR/AR manager 128 receives updated application content from the application based on the input. For example, the updated application content may be received on an ongoing basis as the input is provided, and may comprise a visual representation of the input, such as virtual ink. VR/AR manager 128 composes an updated scene each time updated application content is received, the updated scene including the updated application overlaid onto the artifact. VR/AR manager 128 provides updated scenes to client device 140 on an ongoing basis for display to the user such that the user sees virtual ink appearing on the touch pad in the scene as the user provides touch input to the touch pad.

VR/AR manager 128 may further receive input from client device 140 related to the scene, such as when a user of client device 140 drags and drops application content onto a point within a region in the scene or when the user initiates or configures an accessibility feature. For instance, a service 126 may define one or more regions adjacent to a "primary" display area that is overlaid onto an artifact in the scene, and the one or more regions may be indicated in the scene composed by VR/AR manager 128. For example, the regions may be indicated by rectangular outlines in the scene. The user may provide input by dragging an application window onto a point within one of the regions, and client device 140 may provide the user's input to VR/AR manager 128. VR/AR manager 128 may snap the application content onto the region, such as by composing a new scene in which the application content is overlaid onto the region. In some embodiments, the relative pose of the application content is based on the relative pose of an artifact (e.g., that is augmented with application content) to which the region is adjacent.

In certain embodiments, VR/AR manager 128 facilitates accessibility features for application content. In one example, VR/AR manager 128 receives input from client device 140, such as received from a user, initializing or configuring an accessibility feature. For example, the user may interact with application content displayed in the VR/AR scene to activate an accessibility feature. VR/AR manager 128 may interface with one or more of services 126, containers 127, or other remote components to provide accessibility features in the VR/AR environment or may implement accessibility features directly. In one example, the user activates a magnification feature, and VR/AR manager 128 magnifies a portion of the application content, such as based on user input (e.g., the user may hover a cursor over the portion of the application content), and adds the magnified content to a region adjacent to the application content in scene. For example, the region may be a rectangular region directly above the artifact on which the application content is displayed.

Computing device 130 comprises a VR/AR engine 132, which may perform functions related to providing a user of client device 140 with a VR or AR experience of a service 126 or an application in a container 127. By implementing VR/AR functionality with VR/AR engine 132 on computing device 130 (and VR/AR manager 128 on computing device 120), there may not be a need for a service 126 to natively support VR/AR technology, or for the computing resources of client device 140 to be burdened with all of the processing associated with such functionality. While VR/AR engine 132 is depicted as being located on a single computing device 130, VR/AR engine 132 may also be distributed across a plurality of computing devices, or may be located on the same computing device as service 126.

In an embodiment, a user may utilize VR/AR client 142 on client device 140 to access a service 126 as a VR/AR experience, and VR/AR engine 132 may act as an intermediary to provide at least a portion of this functionality. For example, client device 140 may use an associated camera to capture real-time images of the real-world environment around client device 140 (e.g., images may be captured at a frame rate and resolution specified by VR/AR engine 132, such as 15 Hz and 640×480) and provide these images to VR/AR engine 132 (e.g., via network 110). VR/AR engine 132 may acquire the images from client device 140 and then perform pre-processing in order to prepare the images for feature detection. In alternative embodiments, client device 140 may perform preprocessing and/or feature detection. Pre-processing of an image may involve, for example, resizing the image (e.g., using bilinear interpolation) and filtering the image (e.g., smoothing, noise removal, and the like). Filtering the image may be accomplished, for example, by a convolution process involving the use of a Gaussian filter. Throughout pre-processing, image data is preferably passed among various functions (e.g., software methods) of VR/AR engine 132 by reference (as opposed to performing a deep copy of the image data) in order to conserve resources. Once VR/AR engine 132 has completed pre-processing, feature detection begins.

A feature refers to a unique characteristic of an image that helps to uniquely identify it. For example, an artifact (e.g., an object, such as a piece of paper) in the scene may be a feature. VR/AR engine 132 may use a feature detection method such as the open-source A-KAZE feature detection program. In some embodiments, VR/AR engine 132 uses homography, which involves finding the geometric transform between two planar images, in the feature detection process. VR/AR engine 132 may calculate homography using random sampling consensus (RANSAC), which comprises an iterative method to estimate parameters of a mathematical model from a set of observed data that contains outliers, the outliers being accorded no influence on the values of the estimates. VR/AR engine 132 may use feature detection to search for a particular artifact in the scene, such as an artifact defined in a context.

VR/AR engine 132 comprises a context registry master 134, which may perform operations related to registering contexts for detection, as described herein. For example, context registry master 134 may receive a context for detection from VR/AR manager 128, and may register the context for detection. Registration may comprise, for example, storing context information (e.g., received from VR/AR manager 128) in a data structure and forwarding the context information to client device 140 (or any other devices which detect contexts). In certain embodiments, context registry master 134 communicates with client device 140 to determine whether a user approves registering the context for detection, and only registers the context for detection when the user approves.

A context may specify one or more artifacts to be detected, and/or other conditions under which augmentation is to be performed (e.g., that augmentation is to be performed when the user is at a certain geographic location, determined using a global positioning system associated with client device 140). In these embodiments, VR/AR engine performs feature detection only if the condition(s) specified by the user are satisfied (e.g., if client device 140 indicates that it is in a particular geographic location).

VR/AR engine 132 may perform pre-processing on the images, and then proceed to detecting and extracting features from the images. For example, VR/AR engine 132 may identify a particular artifact such as a piece of paper with some pattern printed on it (in case of marker-based detection), some relevant context-specific object like a computer numeric control (CNC) machine or car's engine (in case of marker-less detection), or a touch pad, such as a touch pad on a laptop or touchscreen on a tablet computer, in the scene so that the artifact can be "augmented" with content such as the execution screen of a virtual desktop or application running on the virtualized infrastructure. For example, VR/AR engine 132 may detect a context which has been registered as a context for detection (e.g., at the request of an application). If the scene image is too shaky to detect features, the image may be stabilized first. Once an artifact specified in a registered context has been detected and extracted, VR/AR engine 132 may provide a notification to VR/AR manager 128 including context detection information. VR/AR engine 132 may notify the application that the context has been detected, and the application may provide application content (e.g., a text box from the virtual desktop) so that the application content may be added onto the scene in which the artifact was detected. In certain embodiments, the application also provides a relative pose of the application content (e.g., coordinates for the application content relative to an origin or to the artifact in the scene), and VR/AR manager 128 may compose a scene containing the application content based on the relative pose of the application contents received from one or more applications.

In some embodiments, VR/AR manager 128 (or another component, such as VR/AR engine 132) may perform a warp operation in order to modify the perspective of the application content (e.g., if the application content is to be placed onto an artifact, the perspective of the application content may be warped so that it will match that of the artifact on which it is to be added) when generating the scene. VR/AR manager 128 may then generate a mask for the application content in order to augment the scene image with the application content. For example, the mask may be a transparent image that corresponds to the dimensions of the scene, and the application content may be placed at the relative pose within the mask. The application content with the mask may be copied onto the scene image, and the final image may be rendered and output to the client device for display. This process may be performed on an ongoing basis (e.g., so that the application content continues to track with the artifact as it moves in the scene image in real-time as the pose of the application content are defined relative to the artifact).

When VR/AR engine 132 has identified an artifact in the scene to be augmented (e.g., through feature detection), VR/AR engine 132 may draw a bounding box around the detected artifact in the scene image and obtain the coordinates of the bounding box by applying a perspective transform on the artifact using the homography matrix which represents the geometric transform between the scene image and the artifact. The bounding box may be used by VR/AR engine 132 to extract or isolate the artifact from the rest of the scene. The position of the artifact is then tracked for each subsequent image in the scene (e.g., each subsequent frame acquired from the camera of client device 140).

Other methods of detecting and extracting artifacts may be employed as well without departing from the scope of the present disclosure, such as alternative machine learning algorithms.

When VR/AR engine 132 (or, in other embodiments, client device 140) has detected/extracted the artifact specified in the context in the scene, and/or has determined that any necessary conditions specified in the context are satisfied (e.g., client device 140 is in a particular geographic location), VR/AR engine 132 continues with the augmentation process. For example, VR/AR engine 132 may provide context detection information (e.g., the context identifier and a pose of the artifact) to VR/AR manager 128. In response, VR/AR engine 132 may receive a scene from VR/AR manager 128 which includes application content at a particular pose in the scene (e.g., relative to the artifact). VR/AR engine 132 may send the scene to client device 140 to be displayed as a virtual reality or augmented reality experience. In certain embodiments, VR/AR engine 132 performs processing on the scene before sending it to client device 140 for display. For example, VR/AR engine 132 may perform warping on application content in the scene by applying a geometric transform (e.g., perspective transform) to the application content. In some embodiments, the geometric transform is based on the nearest neighbor interpolation technique, which approximates the value of a function for a non-given point in a particular space when given the value of that function in points around (neighboring) that point. Once the application content has been warped appropriately (e.g., to match an orientation of the artifact in the scene), VR/AR engine 132 may generate a binary mask for the application content so that the application content may be appropriately placed in the scene.

VR/AR engine 132 may then produce a final scene by copying the pixel buffer of the warped application content, using the binary mask generated above, to the scene acquired from client device 140. This results in a final scene wherein the application content appears relative to the artifact in the user's environment. In certain embodiments, VR/AR engine 132 continuously tracks the coordinate frame of the artifact as subsequent scene images are acquired (e.g., from the camera on client device 140) and augments it with application content (e.g., warped application content received in a scene from VR/AR manager 128). The final scene may be rendered by VR/AR engine 132 and provided to client device 140 so that the user may view the augmented reality experience. For example, if client device 140 comprises a wearable AR display, the user's environment will appear through the wearable display to be augmented with the application content (e.g., a notification from the service 126) being overlaid on the artifact (e.g., an object in the user's environment), moving with the artifact as it is moves in the user's environment. Alternatively, the application content may be placed relative to another point in the user's environment, such as an origin of a detected artifact.

In certain embodiments, VR/AR engine 132 may interact with a virtual infrastructure manager 158, connected over network 110, to perform a variety of actions on a virtual machine on computing device 120 based on input from client device 140 (e.g., using input such as gestures), such as suspending, starting, stopping, taking a snapshot, taking a screenshot, triggering migration, creating templates, and sharing the virtual machine. In alternative embodiments, some processing attributed to VR/AR engine 132 or VR/AR manager 128 above may be instead performed by client device 140 (e.g., by VR/AR client 142). For example, warping and/or rendering tasks may be performed by client device 140. In some embodiments, the pixel buffer of the application content (e.g., a virtual desktop screen buffer or a notification from a service 126) does not need to be copied to the scene by VR/AR engine 132 or VR/AR manager 128. In these embodiments, the coordinates of the bounding box of the artifact is used in order to project the application content onto the origin (e.g., (0,0)) of the coordinate frame by the client device 140 (e.g., augmented reality glasses or mobile phone).

In other embodiments, application content may be projected into a scene relative to a plurality of artifacts or onto a fixed location which is not tied to any artifacts in the user's environment.

In certain embodiments, VR/AR engine 132 may also augment scene images with advertisements. For example, VR/AR engine 132 may acquire one or more advertisements (e.g., from a service 126, an advertisement server or data store, etc.), which may comprise multimedia such as video and images, warp the one or more advertisements (e.g., in a manner similar to that described above with respect to other application content), and add the one or more advertisements to the scenes so that the user will see the one or more advertisements in the final scenes through client device 140. In some embodiments, advertisements may be added on or near an artifact to be augmented with application content. The user may then be able to interact with the one or more advertisements using client device 140, such as through gestures, touch screen, mouse or keyboard. Placing advertisements in a VR or AR space allows for a significant expansion of the display area available for such advertisements.

Client device 140 may comprise a computing device (e.g., desktop or laptop computer, mobile phone, VR/AR headset, or the like) through which a user interacts with one or more services 126 or applications in containers 127 as a VR/AR experience. While a single client device 140 is shown, it is understood that a plurality of client devices may also interact with the one or more services 126 or applications in containers 127 as part of the same or a separate VR/AR experience. Client device 140 comprises a VR/AR client 142, which may comprise an application through which client device 140 interacts with one or more remote services as a VR/AR experience. As shown, VR/AR client 142 comprises a client composer 144 and a context database (DB) manager 146. Client composer 144 may perform options related to composing scenes for display on client device 140. For example, in certain embodiments, client composer 144 may receive application content and a pose of the application content (e.g., from VR/AR manager 128 or VR/AR engine 132), which client composer 144 may add to a scene (e.g., application content such as a graphical object may be added to a scene comprising the user's environment in order to provide an augmented reality experience). In alternative embodiments, such as those described above, application content is added to scenes by other components, such as VR/AR manager 128 or VR/AR engine 132.

In one embodiment, a service 126 notifies VR/AR manager 128 that application content is either static or dynamic. If the application content is static (e.g., graphical properties of the application content, such as visual appearance, shape, texture, reflective properties, and the like do not change with respect to space and time), then VR/AR manager 128 may forward the application content along with a pose received from the service 126 to client composer 144 without adding the application content to the scene. When client composer 144 receives the application content and the pose of the application content, then it may further augment the scene (e.g., the user's environment) with the application content at the received pose on top of the existing scene. If application content is dynamic, VR/AR manager 128 may add the application content to the scene before forwarding it to VR/AR client 142 (either directly or in cooperation with VR/AR engine 132).

Context DB manager 146 may perform operations related to registering contexts for detection. For example, context DB manager 146 may receive context information from context registry master 134, and may add the context information to a database of contexts for detection. In certain embodiments, context DB manager 146 may request approval from a user of client device 140 before adding the context information to the database. For example, the user may be shown a notification in VR/AR client 142 including the context information and requesting the user's approval to detect the context. If the user approves, context DB manager 146 may add the context information to the database, and VR/AR client 142 may detect the context. If the user does not approve, context DB manager 146 may discard the context information and/or send a notification back to context registry master 134 indicating that the context has not been approved for detection. Context registry master 134 may forward the notification back to VR/AR manager 128, which may notify the service 126 that the context has not been approved for detection by the user of client device 140.

Embodiments of the present disclosure may be useful in a variety of contexts, such as, for example, that of virtual assistants. A virtual assistant (e.g., associated with an operating system) may employ techniques described herein to register contexts for detection and deliver content such as notifications and graphical objects to one or more client devices to be displayed as an augmented reality experience. Furthermore, according to embodiments of the present disclosure, a plurality of client devices may receive and interact with the same application content simultaneously (e.g., users of multiple devices may interact with a graphical model of a car engine provided by a particular application). These embodiments may improve collaboration and allow for new possibilities in the augmented reality and virtual reality space. Furthermore, techniques described herein may be useful for interacting with remote desktops in a VR or AR environment. The ability to snap application windows onto regions within a VR/AR environment allows for a multiple display setup (e.g., a conventional multiple monitor configuration) to be simulated in the VR/AR environment and the ability to snap application content onto a touch pad allows for touch input to be provided directly to an application window and, in some cases, for virtual ink corresponding to the touch input to be displayed within the VR/AR environment, thereby improving the user experience. Additionally, making use of VR/AR space to provide accessibility features to users of an application improves the user experience and makes applications accessible to a broader user base in the context of VR and AR.

Computing device 150 comprises virtual infrastructure manager 158, which may perform operations based on input received from client device 140 (e.g., using input such as gestures). Computing device 150 further comprises a virtual desktop infrastructure manager 159, which may perform operations related to collecting configuration information of virtual desktops on computing device 120, like user entitlements and desktop protocol preferences (BLAST, PCoIP, etc.). These configurations are used by the VR/AR engine to control the access of AR content (screen of virtual desktop or application running on it) to different users.

In some embodiments, if graphics processing unit (GPU) virtualization support (e.g., NVidia GRID) is available on computing device 120 or computing device 130, the solution may use them to execute accelerated high performance parallel versions of the computer vision and related machine learning routines to provide a better augmented reality experience. This will also make the solution less expensive, as multiple users can share the GPU (which is now virtualized and shared on the datacenter) for their VR/AR content (virtual desktop or application running on it), thereby reducing the overall expenditure of the enterprise.

Figure 1B:
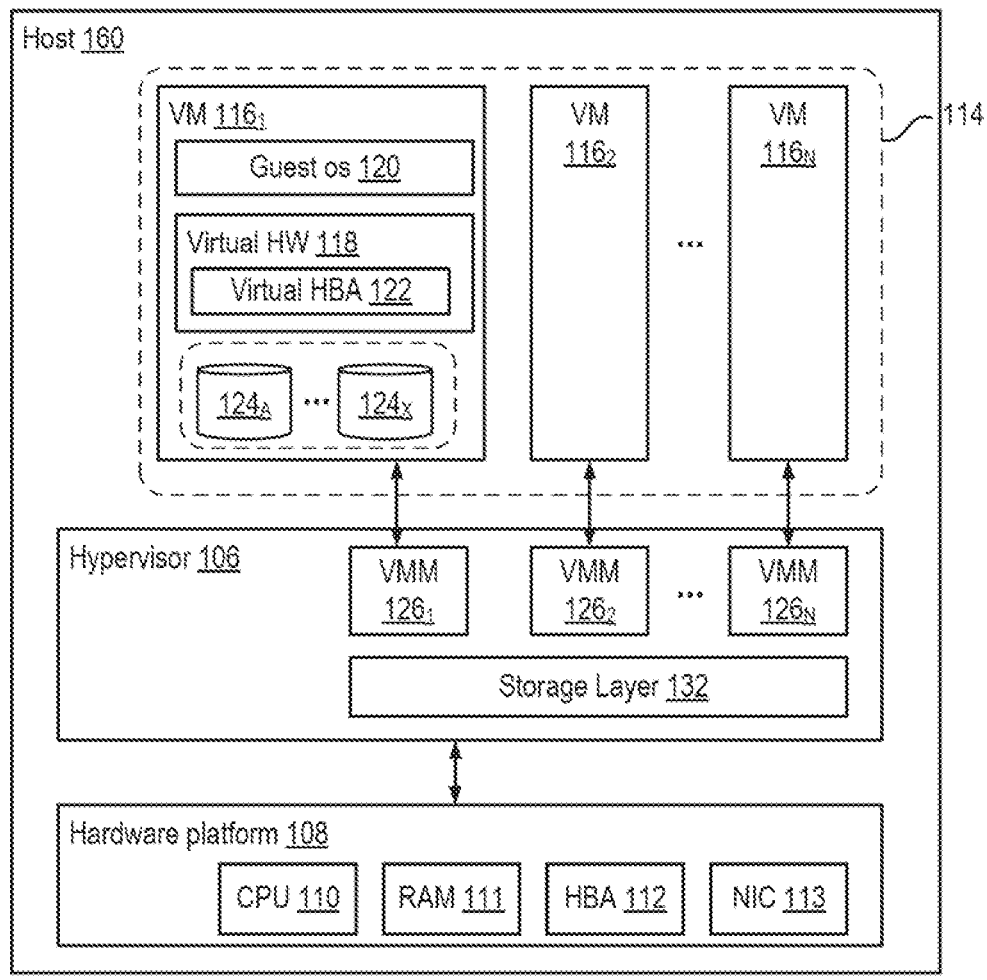
FIG. 1B illustrates additional components of an example computing environment in which an embodiment may be implemented.

FIG. 1B illustrates additional components of a computing environment in which embodiments of the present disclosure may be implemented.

Host 160 generally represent a physical computing device (e.g., a server) that is configured to provide a virtualization layer that abstracts processor, memory, storage, and networking resources of a hardware platform 108 into multiple virtual machines (VMs) 116 that run concurrently on the same host 160. One or more of VMs 116 of FIG. 1B may, in some embodiments, be representative of one or more of computing devices 120, 130, or 150 in computing environment 100 of FIG. 1A. VMs 116 run on top of a software interface layer, referred to as a hypervisor 106, that enables sharing of the hardware resources of host 160 by VMs 116. One example of hypervisor 106 is a VMware ESXi hypervisor provided as part of the VMware vSphere solution made commercially available from VMware, Inc. In some embodiments, storage system 104 may be implemented as software-defined storage such as VMware Virtual SAN that clusters together server-attached hard disks and/or solid state drives (HDDs and/or SSDs), to create a flash-optimized, highly resilient shared datastore designed for virtual environments.

Host 160 may comprise a general purpose computer system having one or more virtual machines accessing data stored on a storage system 104 communicatively connected to host 160. Host 160 may be constructed on a conventional, typically server-class, hardware platform 108. Hardware platform 108 of host 160 may include conventional physical components of a computing device, such as a processor (CPU) 109, a memory 111, a disk interface 112, and a network interface card (NIC) 113. Processor 109 is configured to execute instructions, for example, executable instructions that perform one or more operations described herein and may be stored in memory 111. Memory 111 and storage system 104 are devices allowing information, such as executable instructions, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 160 to communicate with a storage device, such as storage system 104, to store "virtual disks" that are accessed by VMs 116, as described later. Network interface 113 enables host 160 to communicate with another device via a communication medium, such as a communication network (not shown). An example of network interface 113 is a network adapter, also referred to as a Network Interface Card (NIC).

While storage system 104 is typically made up of a plurality of disks, other forms of storage, such as solid-state non-volatile storage devices, may be used, and the use of the term, "disk" herein, should therefore not be construed as limited only to rotating disk storage media, but may also be construed to encompass solid state disks, or "SSDs." In some embodiments, storage system 104 may be comprised of high-density non-volatile memory. Furthermore, while storage system 104 is depicted as a separate, external component to host 160, storage system 104 may be internal to host 160, for example, a local storage device or locally attached storage.

As shown in FIG. 1B, a hypervisor 106 is installed on top of hardware platform 108 and supports a virtual machine execution space 114 within which multiple virtual machines (VMs) 116₁-116N may be instantiated and executed. Each such virtual machine 116₁-116N implements a virtual hardware platform 118 that supports the installation of a guest operating system (OS) 119 which is capable of executing one or more applications (not shown). Examples of a guest OS 119 include any of the well-known commodity operating systems, such as Microsoft Windows, Linux, and the like. Hypervisor 106 includes a storage layer 133 configured to manage storage space persistently for VMs 116 via VMM layers 129₁ to 129N.

As used herein, a "virtual desktop" is a desktop running on a VM (e.g., one of VMs 116) that is displayed remotely on a client device (e.g., client device 140 of FIG. 1A) as though the virtualized desktop were running on the client device. By opening an interface (e.g., a virtual desktop client application or a VR/AR client application), a user of the client device accesses, through network 110 of FIG. 1A, a remote desktop running in host 160, from any location, using the client device. Frames of the remote desktop running on the VM are transmitted to the client device at a certain frame rate in format such as bitmap, raster graphic image, or vector graphics image. Frames may be transmitted using a desktop delivery protocol such as VMware® Blast™, or Microsoft® Remote Desktop Protocol (RDP)™.

After transmission, the frames are displayed on the client device for interaction by the user. The client device sends user inputs to the VM for processing, taking processing load off of the client device. Such centralized and automated management of virtualized desktops provides increased control and cost savings. The client device may, for example, run VMware® View™, or a special purpose thin client such as those available from Dell, HP, NEC, Sun Microsystems, Wyse, and others.

It should be recognized that the various terms, layers and categorizations used to describe the virtualization components in FIG. 1B may be referred to differently without departing from their functionality or the spirit or scope of the invention. For example, VMMs 129 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 129 such that virtual host bus adapter 122 is removed from FIG. 1B (i.e., since its functionality is effectuated by a host bus adapter emulator within VMM 129).

Figure 2:
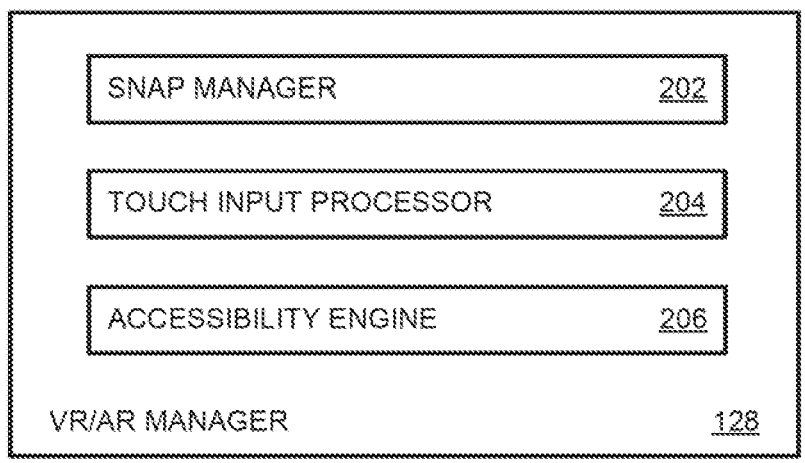
FIG. 2 illustrates components of a virtual reality (VR) and/or augmented reality (AR) manager.

FIG. 2 illustrates components of a virtual reality (VR) and/or augmented reality (AR) manager 128 (of FIG. 1). The components depicted in FIG. 2 are merely exemplary, and the functionality described as being performed by certain components may be performed by any number of local or remote components.

As shown, VR/AR manager 128 comprises snap manager 202, touch input processor 204, and accessibility engine 206. Snap manager 202 generally performs operations related to snapping application content onto regions in a VR/AR environment. Touch input processor 204 generally performs operations related to receiving and processing user input provided via a touch input device (e.g., touch pad, touch screen, or touch bar) present in a VR/AR environment, including augmenting the VR/AR environment with virtual ink corresponding to the touch input. Accessibility engine 206 generally performs operations related to providing accessibility features in a VR/AR environment.

In one example, snap manager 202 receives and registers configuration data (e.g., user-defined policies for display of application content), such as from a user of client device 140 of FIG. 1, for displaying application content in a VR/AR environment through which the user interacts with the application content. For instance, the user may define a policy (e.g., using one or more user interface controls provided to the user in the VR/AR environment) that as soon as first application content (e.g., a first display screen on a virtual desktop) is augmented onto an artifact, VR/AR manager 128 is to render second application content (e.g., a second display screen of the virtual desktop) within a region to the left of the first application content. Policies regarding the particular side relative to the first application content, the size of the region, a name of the second application content (e.g., display 2), the relative orthogonal distance of the region (e.g. the center of the region) from the user's origin (e.g., the coordinates of the center point of the scene from the user's perspective), etc. can be provided by the user, sent from the client device 140 to VR/AR manager 128, and persisted and managed by snap manager 202. Distance parameters provided by the user or determined by snap manager 202 can control the effective distance of the second application content from the user's eyes so as to achieve the best graphics perception experience for the user. Similar settings can be provided for additional regions and application content, such as third application content being displayed in a region to the right of the artifact.

In another example, a user drags and drops application content, such as an application window or display screen, from one location in the VR/AR environment onto a region in the VR/AR environment. For example, the user may provide input by dragging and dropping the application content from an existing display (e.g., augmented on an artifact) or from another location in the VR/AR environment onto a point to the left or right of the existing display. Snap manager 202 receives the input and determines that the point falls within a particular region (e.g., that may have defined in advance by the application, by VR/AR manager 128, or by the user) in the VR/AR environment, and snaps the application content into the particular region. For example, snap manager 202 may retrieve the application content from the application and augment the VR/AR environment with the application content onto the region by composing a scene with the application content overlaid onto the region. Techniques for composing scenes, determining pose, warping, and rendering scenes augmented with application content are described above with respect to FIG. 1. In certain embodiments, snap manager 202 snaps application content onto regions using a default size and augmentation configuration (e.g., distance from an artifact, distance from user, and the like) or a size and augmentation configuration provided by the user.

Snap manager 202 may snap application content onto any region or artifact in a scene based on user input. For example, the user may drag application content onto (or on a particular side of) a physical display device visible in the VR/AR environment, and snap manager 202 may snap the application content so it is overlaid onto (or on a particular side of) the physical display device within the VR/AR environment. In another example, the user drags application content onto a touch input device, such as touch pad, touch screen, or touch bar visible in the VR/AR environment, and snaps manager 202 snaps the application content to the touch input device.

Touch input processor 204 generally receives touch input provided by a user with respect to a VR/AR environment. In one example, the user has a touch input device and snaps an application execution screen, application window, or portion of an application window to the touch input device in the VR/AR environment (e.g., as described above with respect to snap manager 202). For example, the user may snap a partial area of an application screen, such as a drawing canvas area for signature/inking provided by an application, a document, a sub-window area of a word processing application for taking handwritten notes, or the like to the touch input device. The user may then sketch, handwrite, scribble, sign, or the like using the user's finger, a stylus, or other method supported by the touch input device in order to provide touch input to the application. The touch input device's readings (e.g., coordinates of input) is redirected (e.g., from the touch input device's driver) to touch input processor 204, which processes the input. For instance, touch input processor 204 may redirect the input to the application, which may send updated application content to VR/AR manager 128 based on the input, which may compose an updated scene with the updated application content. In some instances, the updated application content includes a visual representation of the input, such as virtual ink. In other embodiments, touch input processor 204 adds virtual ink to the scene based on the input.

In some embodiments, touch input processor 204 augments a touch input device in the scene with additional content, such as three-dimensional content, with which the user can interact in the VR/AR environment. In one example, three-dimensional buttons are overlaid onto the touch input device in the scene by touch input processor 204, and the user is able to provide touch input to select the three-dimensional buttons.

Accessibility engine 206 generally facilitates accessibility features in a VR/AR environment. In one example, a VR/AR scene is augmented with application content (e.g., the application content may be snapped to an artifact or region in the VR/AR environment by snap manager 202), and one or more accessibility features are offered for the application. Accessibility engine 206 receives user input provided by a user with respect to a VR/AR environment, the user input activating or configuring an accessibility feature. In some embodiments accessibility engine 206 processes application content (e.g., virtual desktop frames) received from an application in order to provide accessibility services to the user. For instance, the user may have a disability such as epilepsy, hearing impairment, low proficiency in the language used on a virtual desktop, vision impairment (myopia, colorblindness, hyperopia), and others. An accessibility feature may be, for example, screen magnification, text translation, scene narration in audio format, or filtering of a frame through a color filter to provide better color differentiation for colorblind users.

VR/AR manager 128 composes updated scenes including accessibility features provided by accessibility engine 206. For example, a screen magnification feature may be added to a region above the application context in the scene. The scene is provided to the client device for display to the user. As such, the accessibility feature is provided to the user in a VR/AR environment.

The components of VR/AR manager 128 collectively perform processing related to snapping, processing touch input, and providing accessibility features in VR/AR environments. In alternative embodiments, certain processing and/or rendering tasks may be performed by any combination of local or remote components, such as VR/AR engine 132 and client composer 144 of FIG. 1.

Figure 3:
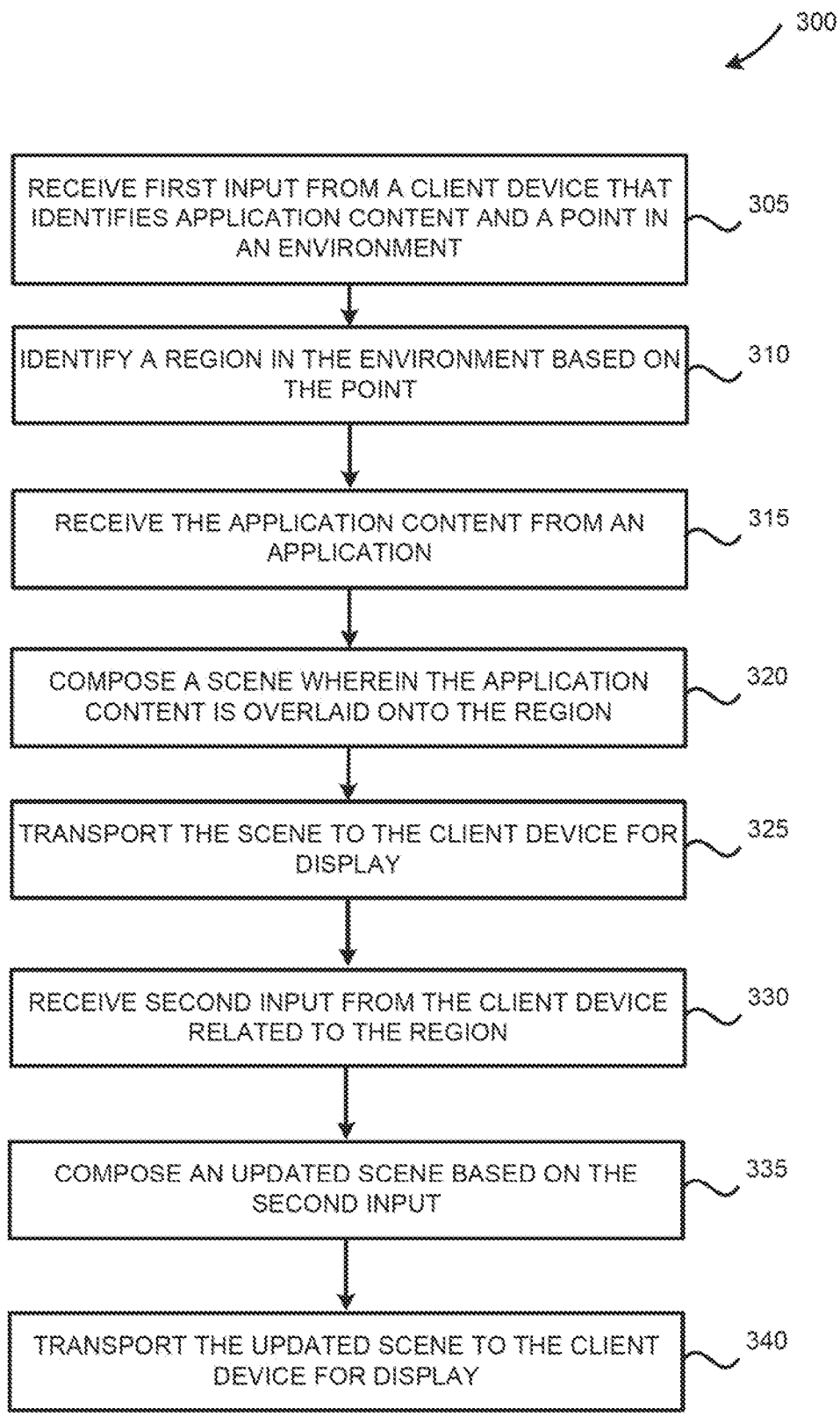
FIG. 3 illustrates example operations for providing a VR/AR experience, according to embodiments of the present disclosure.

FIG. 3 illustrates example operations 300 for providing a VR/AR experience, according to embodiments of the present disclosure. For example, operations 300 may be performed by VR/AR manager 128 of FIGS. 1 and 2.

At 305, first input is received from a client device, the first input identifying application content and a point in an environment. For instance, a user interacting with a VR/AR environment may drag and drop an application window onto a point in the VR/AR environment using a client device, and the client device may provide the user's drag and drop input to VR/AR manager 128 of FIGS. 1 and 2.

At 310, a region in the environment is identified based on the point. For example, VR/AR manager 128 of FIGS. 1 and 2 may determine that the point identified in the first input falls within a particular region in the VR/AR environment that is designated (e.g., according to configuration data provided by a user) for display of application content. In another embodiment, VR/AR manager 128 of FIGS. 1 and 2 determines that the point falls within a touch input device, such as a touch pad, in the VR/AR environment.

At 315, the application content identified by the user is received from an application. For example, VR/AR manager 128 of FIGS. 1 and 2 may request the content of the application window from the application, which may provide the content in response.

At 320, a scene is composed wherein the application content is overlaid onto the region. For example, VR/AR manager 128 of FIGS. 1 and 2 may augment the region in the scene with the application content, such as by stretching the application content to fill the region or otherwise adding the application content to the region in the scene.

At 325, the scene is transported to the client device for display. For example, VR/AR manager 128 of FIGS. 1 and 2 may send the scene to the client device, and the client device may display the scene to the user as a VR/AR experience.

At 330, second input is received from the client device, the second input being related to the region. For example, the user may interact with the application content displayed in the region. If the region is a touch pad, the user may provide touch input via the touch pad, and the touch input may be provided to VR/AR manager 128 of FIGS. 1 and 2. In another example, the user may interact with the region to activate or configure an accessibility feature.

At 335, an updated scene is composed based on the input. In one example, the input is touch input to a touch pad, and VR/AR manager 128 of FIGS. 1 and 2 composes the updated scene by adding virtual ink corresponding to the touch input to the scene. In another example, the input is an activation of an accessibility feature, and VR/AR manager 128 of FIGS. 1 and 2 composes the updated scene by adding the accessibility feature to the scene.

At 340, the updated scene is transported to the client device for display. For example, VR/AR manager 128 of FIGS. 1 and 2 may send the updated scene to the client device, which may display the updated scene (e.g., including virtual ink or an accessibility feature) to the user as a VR/AR experience.

Figure 4:
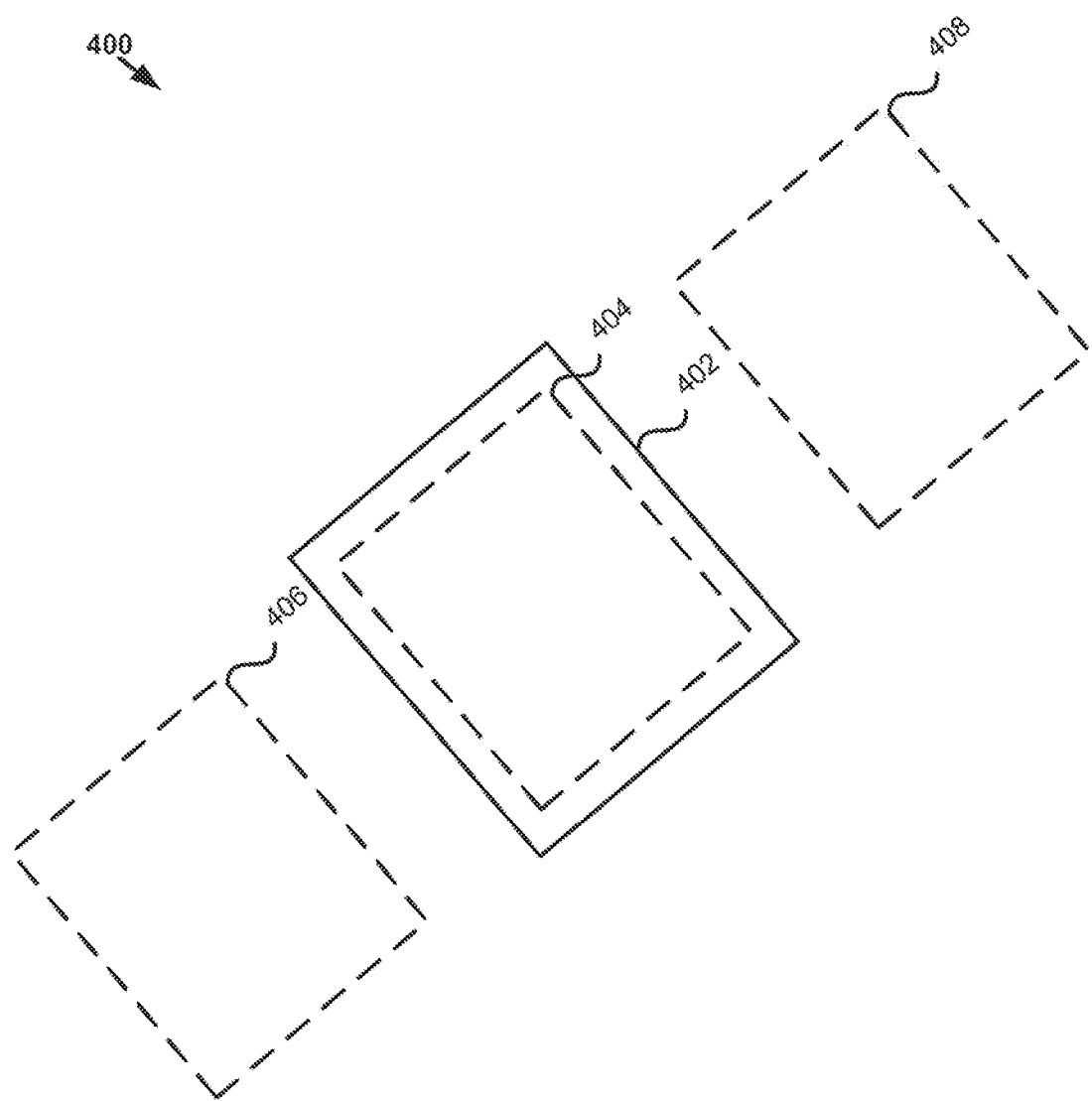
FIG. 4 illustrates an example VR/AR scene according to embodiments of the present disclosure.

FIG. 4 illustrates an example VR/AR scene 400 according to embodiments of the present disclosure. For example, scene 400 may be composed by VR/AR manager 128 of FIGS. 1 and 2, and may depict a user's perspective of a VR/AR environment via a client device such as client device 140 of FIG. 1.

Scene 400 includes an artifact 402. In one example, artifact 402 is a sheet of paper in the user's environment. Artifact 402 is augmented in scene 400 with application content 404, which may be a first display screen of a virtual desktop.

Scene 400 includes regions 406 and 408, each of which may be augmented with application content. For instance, regions 406 and 408 may be augmented with second and third display screens of the remote desktop, thereby simulating a multiple-monitor setup within the VR/AR environment. In one embodiment, regions 406 and 408 are configured as display regions, such as by the user, and are displayed (e.g., as dotted-line outlines) every time artifact 402 is detected in the VR/AR environment or every time application content 404 is displayed.

In one embodiment, application content is snapped onto one or both of regions 406 and 408. For instance, the user may have dragged and dropped application content from another location in the VR/AR environment onto one of regions 406 or 408, and VR/AR manager 128 of FIGS. 1 and 2 may have snapped the application content onto the region.

Figure 5:
FIG. 5 illustrates another example VR/AR scene according to embodiments of the present disclosure.

FIG. 5 illustrates another example VR/AR scene 500 according to embodiments of the present disclosure. For example, scene 500 may be composed by VR/AR manager 128 of FIGS. 1 and 2, and may depict a user's perspective of a VR/AR environment via a client device such as client device 140 of FIG. 1.

Scene 500 includes a touch input device 502, which may be a touch pad, touch screen, or touch bar within the user's environment. In some embodiments, touch input device 502 is connected to the client device through which the user views scene 500.

Touch input device 502 is augmented in scene 500 with application content 504. For instance, the user may have dragged and dropped application content 504 from another location in the VR/AR environment (e.g., application content 404 of FIG. 4) onto touch input device 502. In one example, application content 504 is a signature entry field. VR/AR manager 128 of FIGS. 1 and 2 may have augmented touch input device 502 by stretching application content 504 to fit the size of touch input device 502, such as with a one to one mapping.

The user provides input using the user's hand 506 by drawing on touch input device 502, such as writing the user's signature. Scene 500 is augmented with virtual ink 508 corresponding to the input. Virtual ink 508 is a visual representation of the input provided by the user's hand 506. For instance, the user may see virtual ink 508 appearing in scene 500 in real time as the user provides input.

Figure 6:
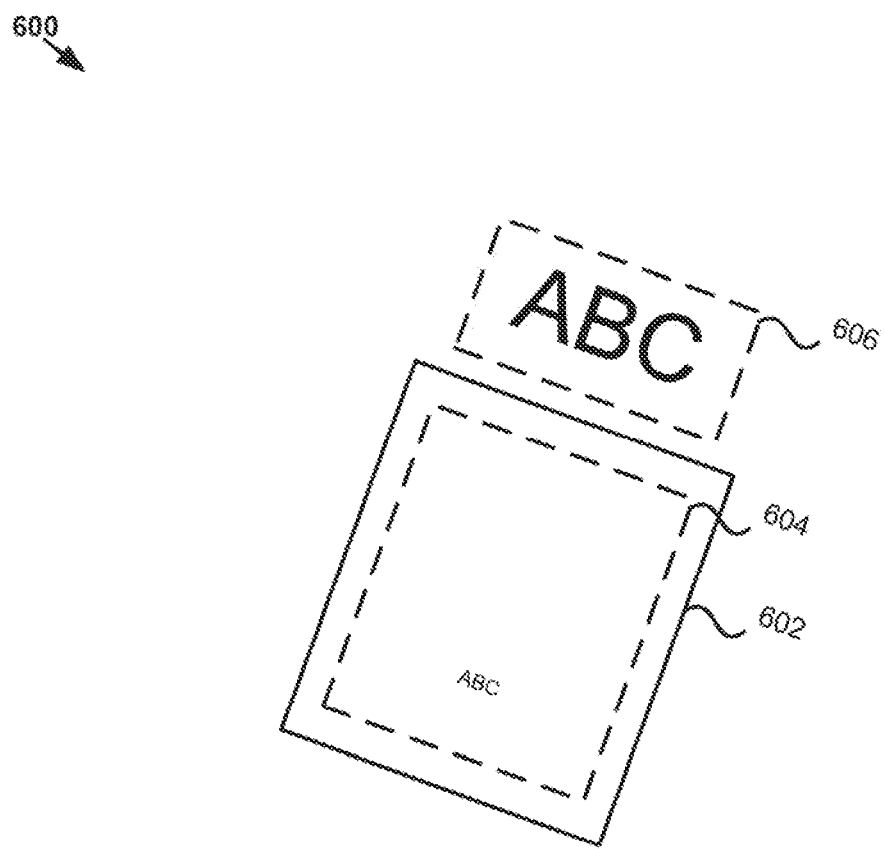
FIG. 6 illustrates another example VR/AR scene according to embodiments of the present disclosure.

FIG. 6 illustrates another example VR/AR scene 600 according to embodiments of the present disclosure. For example, scene 600 may be composed by VR/AR manager 128 of FIGS. 1 and 2, and may depict a user's perspective of a VR/AR environment via a client device such as client device 140 of FIG. 1.

Scene 600 includes an artifact 602, such as a sheet of paper in the user's environment. Artifact 602 has been augmented with application content 604, such as in response to the user dragging and dropping application content 604 onto artifact 602. For example, application content 604 may be snapped to artifact 602.

Scene 600 also includes a region 606 that includes a magnification of a portion (e.e., the text "ABC") of application content 604. For instance, the user may have activated a magnification accessibility feature through interacting with application content 604, and VR/AR manager 128 of FIGS. 1 and 2 may have composed scene 600 by adding a magnification of a portion (e.g., defined by the user, such as through dragging a cursor over to portion) of application content 604 to region 606.

In certain embodiments, the user has configured accessibility features so that magnification is always displayed in a region above the relevant content, such as region 606 above application content 604. In other embodiments, the user may snap the magnification content onto region 606.

It is noted that the examples depicted in FIGS. 4-6, such as three side-by-side display regions, entering a signature via a touch pad, and magnification of text within application content, are not limiting, and other examples are possible.

Embodiments of the present disclosure may be useful in a vast number of contexts, as they allow for an improved VR/AR experience, even for applications and services that do not natively support VR or AR or the particular techniques described herein, and which may be too resource-intensive for VR/AR functionality to be implemented primarily on user devices with limited resources such as wearable AR displays or mobile phones. Embodiments may be useful, for example, in environments where traditional displays and input devices are inconvenient, such as hospitals, security and defense contexts, research labs, and space facilities (e.g., the International Space Station). Additionally, in such environments, physical space may be limited and users may have difficulty providing traditional input. Allowing application content such as notifications or graphics to be rendered into the user's environment so that the user can view and interact with application content in a more dynamic fashion may significantly improve the user's experience of applications. Furthermore, providing users with the ability to snap application content into particular regions allows for improved utilization of the expanded display areas available in VR/AR environments. Allowing users to provide touch input via touch input devices detected in VR/AR environments and, in some cases, displaying virtual ink as the user provides touch input in VR/AR environments, allows for improved user experiences and processing related to input in VR/AR. Providing accessibility features for application content in VR/AR environments increases the number of users that can make use of VR/AR functionality and improves the experience of many users, such as disabled users.

Furthermore, because embodiments of the present disclosure involve the abstraction of VR/AR functionality away from applications and individual client devices, they may allow multiple users to collaborate in a VR/AR experience of a single application. For example, multiple client devices may receive scene images comprising the same application content associated with a service 126, which may be continuously updated at all client devices based on user input received from all client devices, thus providing a unified collaborative VR/AR experience of the service 126. In some embodiments, for example, a user may share content of an application running on a virtual machine with a user of another client device, and both users may view and interact with the virtual machine application content through a shared augmented reality experience. Allowing users to collaborate in a VR/AR experience of a single application is described in a co-pending application by Shubham Verma filed on Feb. 5, 2018, having Ser. No. 15/888,112, entitled "AUGMENTED REALITY AND VIRTUAL REALITY ENGINE FOR VIRTUAL DESKTOP INFRASTRUCTURE," the contents of which are incorporated herein by reference.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for providing an augmented reality experience, comprising:
   receiving, by a computing device from an augmented reality or virtual reality (AR/VR) device, first input that identifies application content and a location of an artifact in an AR/VR environment;
   determining, by the computing device, that the artifact in the AR/VR environment comprises a touch input device based on determining that the touch input device is visible, at the location, in one or more images received from the AR/VR device;

receiving, by the computing device, the application content from an application;

composing, by the computing device, a first scene wherein the application content is overlaid onto the touch input device;

transporting, by the computing device, the first scene to the AR/VR device, wherein the AR/VR device displays the first scene;

receiving, by the computing device from the touch input device, touch input provided by a user;

composing, by the computing device, a second scene wherein the application content overlaid onto the touch input device is modified based on the touch input, wherein the second scene comprises a visual representation of the touch input, and wherein composing, by the computing device, the second scene comprises:

providing the touch input to the application by redirecting coordinates of input determined by a driver of the touch input device to the application; and receiving modified application content from the application, wherein the modified application content comprises the visual representation of the touch input; and transporting, by the computing device, the second scene to the AR/VR device, wherein the AR/VR device displays the second scene.

2. The method of claim 1, wherein composing, by the computing device, the first scene comprises augmenting the touch input device in the first scene with the application content based on default augmentation configuration values.

3. The method of claim 1, wherein composing, by the computing device, the first scene comprises scaling the application content based on dimensions of the touch input device.

4. The method of claim 1, wherein the application content comprises a partial area of an application screen in which touch input is to be entered.

5. A system for providing an augmented reality experience, comprising:

at least one memory; and at least one processor coupled to the at least one memory, the at least one processor and the at least one memory configured to:

receive, by a computing device from an augmented reality or virtual reality (AR/VR) device, first input that identifies application content and a location of an artifact in an AR/VR environment;

determine, by the computing device, that the artifact in the AR/VR environment comprises a touch input device based on determining that the touch input device is visible, at the location, in one or more images received from the AR/VR device;

receive, by the computing device, the application content from an application;

compose, by the computing device, a first scene wherein the application content is overlaid onto the touch input device;

transport, by the computing device, the first scene to the AR/VR device, wherein the AR/VR device displays the first scene;

receive, by the computing device from the touch input device, touch input provided by a user;

compose, by the computing device, a second scene wherein the application content overlaid onto the touch input device is modified based on the touch input wherein the second scene comprises a visual representation of the touch input, and wherein composing, by the computing device, the second scene comprises:

providing the touch input to the application by redirecting coordinates of input determined by a driver of the touch input device to the application; and receiving modified application content from the application, wherein the modified application content comprises the visual representation of the touch input; and transport, by the computing device, the second scene to the AR/VR device, wherein the AR/VR device displays the second scene.

6. The system of claim 5, wherein composing, by the computing device, the first scene comprises augmenting the touch input device in the first scene with the application content based on default augmentation configuration values.

7. The system of claim 5, wherein composing, by the computing device, the first scene comprises scaling the application content based on dimensions of the touch input device.

8. The system of claim 5, wherein the application content comprises a partial area of an application screen in which touch input is to be entered.

9. A non-transitory computer-readable medium storing instructions that, when executed by one or more processors, cause the one or more processors to:

receive, by a computing device from an augmented reality or virtual reality (AR/VR) device, first input that identifies application content and a location of an artifact in an AR/VR environment;

determine, by the computing device, that the artifact in the AR/VR environment comprises a touch input device based on determining that the touch input device is visible, at the location, in one or more images received from the AR/VR device;

receive, by the computing device, the application content from an application;

compose, by the computing device, a first scene wherein the application content is overlaid onto the touch input device;

transport, by the computing device, the first scene to the AR/VR device, wherein the AR/VR device displays the first scene;

receive, by the computing device from the touch input device, touch input provided by a user;

compose, by the computing device, a second scene wherein the application content overlaid onto the touch input device is modified based on the touch input, wherein the second scene comprises a visual representation of the touch input, and wherein composing, by the computing device, the second scene comprises:

providing the touch input to the application by redirecting coordinates of input determined by a driver of the touch input device to the application; and receiving modified application content from the application, wherein the modified application content comprises the visual representation of the touch input; and transport, by the computing device, the second scene to the AR/VR device, wherein the AR/VR device displays the second scene.

10. The non-transitory computer-readable medium of claim 9, wherein composing, by the computing device, the first scene comprises augmenting the touch input device in the first scene with the application content based on default augmentation configuration values.

11. The non-transitory computer-readable medium of claim 9, wherein composing, by the computing device, the first scene comprises scaling the application content based on dimensions of the touch input device.

12. The non-transitory computer-readable medium of claim 9, wherein the application content comprises a partial area of an application screen in which touch input is to be entered.

* * * * *